US009129033B1

(12) United States Patent  (10) Patent No.: US 9,129,033 B1
Jenkins et al.  (45) Date of Patent: Sep. 8, 2015

(54) CACHING EFFICIENCY USING A METADATA CACHE

(75) Inventors: Jessica Jenkins, San Francisco, CA (US); Ethan Solomita, San Francisco, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/223,011

(22) Filed: Aug. 31, 2011

(51) Int. Cl.
*G06F 12/00* (2006.01)
*G06F 17/30* (2006.01)
*G06F 12/08* (2006.01)

(52) U.S. Cl.
CPC ...... *G06F 17/30902* (2013.01); *G06F 12/0815* (2013.01); *G06F 17/30132* (2013.01); *G06F 17/30997* (2013.01); *G06F 2212/7207* (2013.01)

(58) Field of Classification Search
CPC .......... G06F 11/1435; G06F 2212/312; G06F 11/1064; G06F 17/30; G06F 17/30017; G06F 17/30902; G06F 2212/466; G06F 12/0802; G06F 17/30132; G06F 2212/7207; G06F 11/3409; G06F 2201/81; G06F 9/30181; G06F 2201/885; G06F 9/3836; G06F 9/3857; G06F 11/3476; G06F 17/30321; G06F 17/30864; G06F 17/30997; G06F 12/0815; Y02B 60/1225
See application file for complete search history.

(56) References Cited

U.S. PATENT DOCUMENTS

| | | | | |
|---|---|---|---|---|
| 6,128,627 A * | 10/2000 | Mattis et al. | ........................... | 1/1 |
| 2005/0177687 A1* | 8/2005 | Rao | ............................... | 711/118 |
| 2006/0080553 A1* | 4/2006 | Hall | .............................. | 713/189 |
| 2009/0150511 A1* | 6/2009 | Gross et al. | .................... | 709/213 |
| 2011/0276780 A1* | 11/2011 | Sengupta et al. | ............. | 711/216 |
| 2012/0054444 A1* | 3/2012 | Wang | ............................. | 711/133 |

OTHER PUBLICATIONS

"Cache," From Wikipedia, the free encyclopedia, http://en.wikipedia.org/wiki/Cache, page last modified on Dec. 12, 2011, Accessed on Dec. 23, 2011, 6 pages.

"Cache"From Wikipedia, the free encyclopedia, *Internet Archive Wayback Machine Beta*, http://web.archive.org/web/20110506003237/http://en.wikipedia.org/wiki/Cache, date range from Jan. 15, 2004 to May 6, 2011, page last modified on May 4, 2011, accessed on Dec. 23, 2011, 5 pages.

"Cache algorithms," From Wikipedia, the free encyclopedia, http://en.wikipedia.org/wiki/Cache_algorithms, page last modified on Dec. 12, 2011, 4 pages.

(Continued)

*Primary Examiner* — Hashem Farrokh (74) *Attorney, Agent, or Firm* — Edward A. Gordon; Foley & Lardner LLP (57) ABSTRACT

A computer-implemented method, a system and a computer-readable medium provide for improved caching. A request key for information is received from a requestor and used to retrieve corresponding metadata from a metadata cache. The metadata is analyzed to determine if information related to the request key should be looked up in a primary cache. If so, the information is retrieved from the primary cache. If the metadata indicates against looking up the information in the primary cache, or if the information was not found in the primary cache, the information is loaded, the metadata is updated, and the information is added to the primary cache if analysis of the updated metadata indicates that adding the information is appropriate.

18 Claims, 3 Drawing Sheets

(56) References Cited

OTHER PUBLICATIONS

"Cache algorithms," From Wikipedia, the free encyclopedia, *Internet Archive Wayback Machine Beta*, http://web.archive.org/web/20091116181547/http://en.wikipedia.org/wiki/Cache-algorithms, date range from Nov. 27, 2004 to Nov. 16, 2009, page last modified on Nov. 13, 2009, accessed on Dec. 23, 2011, 4 pages.

"Hash table," From Wikipedia, the free encyclopedia, http://en.wikipedia.org/wiki/Hash_table, page last modified on Aug. 21, 2011, accessed on Aug. 22, 2011, 16 pages.

\* cited by examiner

CACHING EFFICIENCY USING A METADATA CACHE

BACKGROUND

1. Field

Embodiments are generally related to improved caching.

2. Background

Caches are a specialized type of storage used to store information for accelerated subsequent access (also called caching) when the information is retrieved again. A cache may hold a copy of information (or a pointer to or address of the information) so that later requests for the information may be filled more quickly from the cached copy (a cache hit) rather than by fetching from a location with longer data access and retrieval times (a cache miss).

Caches are of limited size, yet receive a continuous flow of requests to insert new content. A cache must typically discard existing content to make room for new content. The decision of what to keep and what to discard is difficult.

One approach currently used to manage cache contents is the least recently used (LRU) approach. This approach provides that the contents of a cache are kept in order from most recently accessed to least recently accessed. When content must be discarded, the least recently accessed content is discarded first.

However, the LRU approach is not always optimal, in that certain useful pieces of data may be heavily used, but only sporadically. Also, the LRU approach only removes cached contents, to make room for new information, based on current requests made to memory. Caches managed under a LRU approach may consume considerable resources storing information that is loaded once, used once and never used again.

Hence, caching techniques in environments where memory and performance issues are important often use computing resources in a suboptimal manner.

BRIEF SUMMARY

A computer-implemented method, system, and computer-readable medium are provided for improved caching. In an embodiment, a request key for information is received from a requestor. Metadata is retrieved from a metadata cache that corresponds to the request key. The metadata is analyzed from the metadata cache to determine whether information related to the request key should be looked up in a primary cache. When the analyzing determines that the information related to the request key should be looked up in the primary cache, the information related to the request key is retrieved from the primary cache. When the analyzing determines that the information related to the request key should not be looked up in the primary cache, or if the information related to the request key was not found in the primary cache, certain steps are performed. These steps include loading the information related to the request key from an information source, updating the metadata value in the metadata cache based on receiving the request key, and determining, based on the updated metadata value, whether storing the information related to the request key in the primary cache is appropriate. When it is determined that storing is appropriate, information related to the request key is stored in the primary cache in association with the request key.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

DETAILED DESCRIPTION

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Various embodiments for providing improved caching are provided. Improved caching may be achieved by creating a second cache as a metadata cache, in addition to a primary cache. The primary cache's contents include a key (for example, in the context of a web cache, the key may include a URL and HTTP headers) and a value (for example, cached data to be provided to the user based on the URL and HTTP headers, such as cached contents of a web page).

The metadata cache's contents include a key and a value. The key for the metadata cache should be a piece of data that can readily be associated with the key for the primary cache. For example, in one embodiment the key for the metadata cache may be a 64-bit hash of the primary cache key. However, hashing is an optional feature of embodiments, and other embodiments may use alternative information as the key for the metadata cache, such as the primary cache key itself or another permutation of the primary cache key. Different bit lengths may be used as well. In general, the key of the metadata cache should be chosen to, with high probability, uniquely represent the primary cache key. The key of the metadata cache may also incorporate information related to the data associated with the primary cache key. The use of hashing in certain embodiments is discussed in greater detail with reference to FIG. 3, below.

By controlling the size of the key and carefully selecting the information stored in the value, the metadata cache's size can be kept small, such that an entry in the metadata cache consumes far less memory than an entry in the primary cache. Restricting the size of the metadata cache is important because the metadata cache will consume memory that might have been used by the primary cache. Hence, it is important to choose the size of the primary and metadata cache carefully to provide optimal results for a given set of available system resources. Such optimal results can be determined by experimenting with various cache configurations, and may vary from environment to environment. For example, experimentation and analysis of operational performance may reveal what cache sizes, key types/sizes, and metadata content provide the optimal results for a given environment.

As discovered by the inventors here, one possible piece of useful information to be stored in the metadata cache's values is the number of times a lookup request has been seen by the cache for the given key. Storing this information in the metadata cache allows rules to be created that use this metadata, such as: Do not add contents to the primary cache until the key has been seen by the metadata cache a specified minimum number of times. Other metadata and its uses is discussed in greater depth, below.

A rule that only adds information that has been seen a specified minimum number of times is valuable because, oftentimes, prospective cache contents may only be requested once. Caching such contents is a waste of resources. Waiting until content has been requested a minimum of two times, for example, increases the likelihood that it will be requested again in the future.

System

Figure 1:
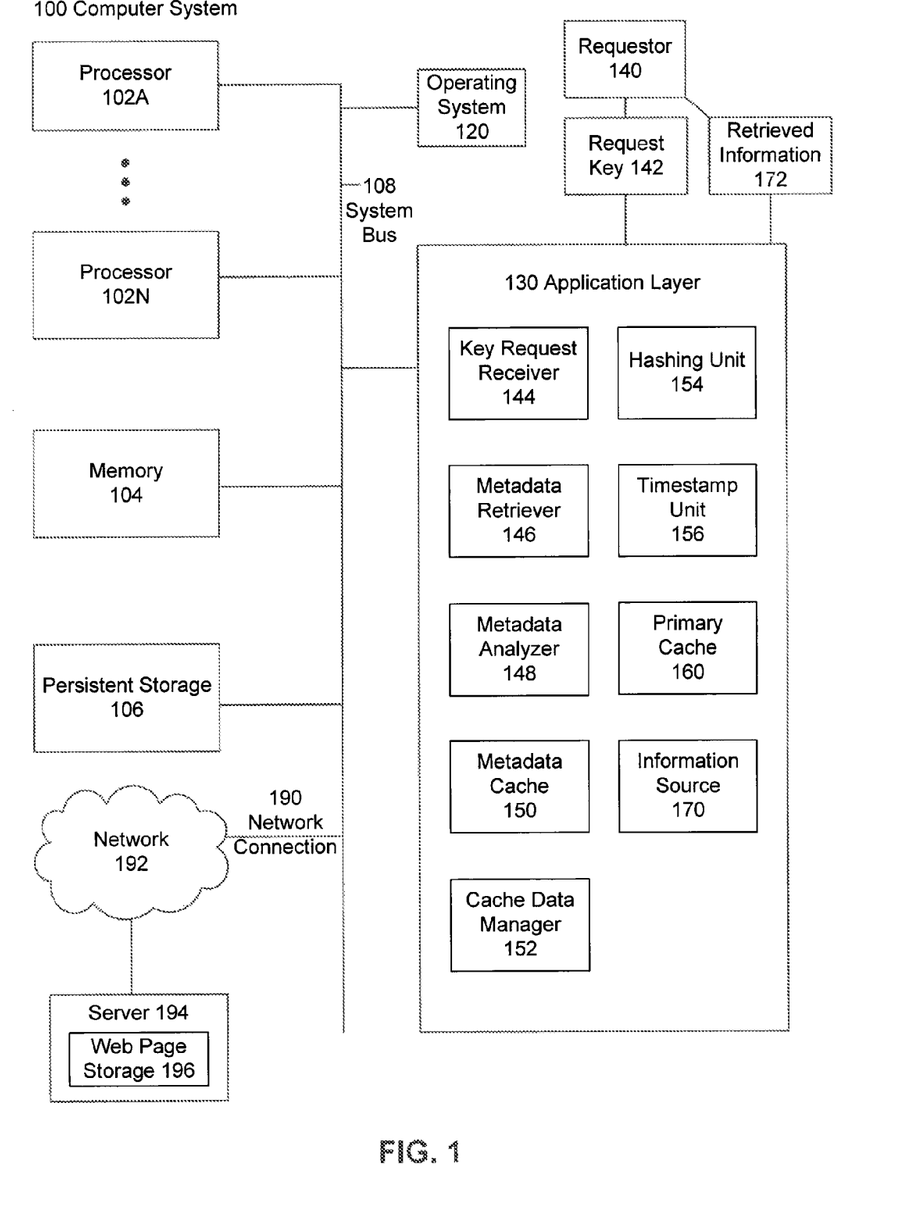
FIG. 1 is a diagram illustrating an exemplary system, according to an embodiment.

FIG. 1 is a diagram illustrating an exemplary system, according to an embodiment. Computer system 100 provides improved caching.

Computer system 100 contains a combination of hardware, software, and/or firmware constituent parts that allow it to run an application layer 130 that includes various subsystems to manage caching. Computer system 100 may have access to additional resources over a network 192 via a network connection 190. For example, network connection may allow computer system 100 to retrieve web pages from network 192 via network connection 190. Such retrieval may manifest locally as an information source 170. Computer system 100 may be a conventional computer such as a desktop or laptop PC, but it may additionally be any web-enabled peripheral such as a game console, a tablet, a netbook, a smartphone, or embedded device. Computer system 100 as shown in FIG. 1 may be organized around a system bus 108, but any type of infrastructure that allows the hardware infrastructure elements of computer system 100 to communicate with and interact with each other may be used to function as this part of computer system 100.

The processing task in the embodiment of FIG. 1 is carried out by one or more processors 102A . . . 102N, but it should be noted that any type of processing technology may be used here, including multi-core processors, multiple processors, or distributed processors.

In order to manipulate data, processors 102A . . . 102N access a memory 104 via system bus 108. For data which needs to be stored more permanently, processors 102A . . . 102N access persistent storage 106. Processors 102A . . . 102N, memory 104 and persistent storage 106 operate in coordination with operating system 120 to provide basic functionality for computer system 100. Operating system 120 provides support functionality for application layer 130.

In an embodiment, application layer 130 includes several subsystems that provide improved caching functionality. The subsystems include a key request receiver 144, a metadata retriever 146, a metadata analyzer 148, a metadata cache 150, a cache data manager 152, a hashing unit 154, a timestamp unit 156, a primary cache 160, and an information source 170. These subsystems interact with web content received via a network connection 190 from server 194 on network 192.

Server 194 may be a web server that provides web content accessed by computer system 100. Specifically, server 194 may host a web page storage 196. Web page storage 196 may be accessed by information source 170 using technologies such as HTTP. Server 194 may include or be coupled to an application server or other device to provide additional services or functionality for different web applications or web services. While a client-server relationship and HTTP have been used to provide web content to information source 170, it may be recognized that other protocols and architectures, such as peer-to-peer networking, may serve as the basis for information exchange for computer system 100.

Computer system 100 may use network connection 190 to communicate with other processing machines via network 192. Network connection 190 may use an appropriate wired connection or appropriate wireless technology to access network 192. Network 192 may be the Internet, a local area network, or any other network 192 of machines with which computer system 100 may exchange data. It is to be noted that computer system 100 may be connected by network 192 via network connection 190 to server 194 that provides information source 170 with a source of content as discussed above.

Each of the constituent parts of a system embodiment may be implemented on any computer system. Such a computer system can include, but is not limited to, a personal computer, mobile device such as a mobile phone, workstation, embedded system, game console, television, set-top box, or any other computer system. Further, the computer system can include, but is not limited to, a device having a processor and memory for executing and storing instructions. Software may include one or more applications and an operating system. Hardware can include, but is not limited to, a processor, memory and graphical user interface display. The computer system may also have multiple processors and multiple shared or separate memory components. For example, the computer system may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of having instructions encoded thereon that may subsequently be used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

In this example, the subsystems 144-170 interact to provide improved caching. Such improved caching has been discussed in general terms above. The specific roles of the various components of certain system embodiments in performing stages in exemplary method embodiments will be discussed in greater detail, below.

Method

Figure 2:
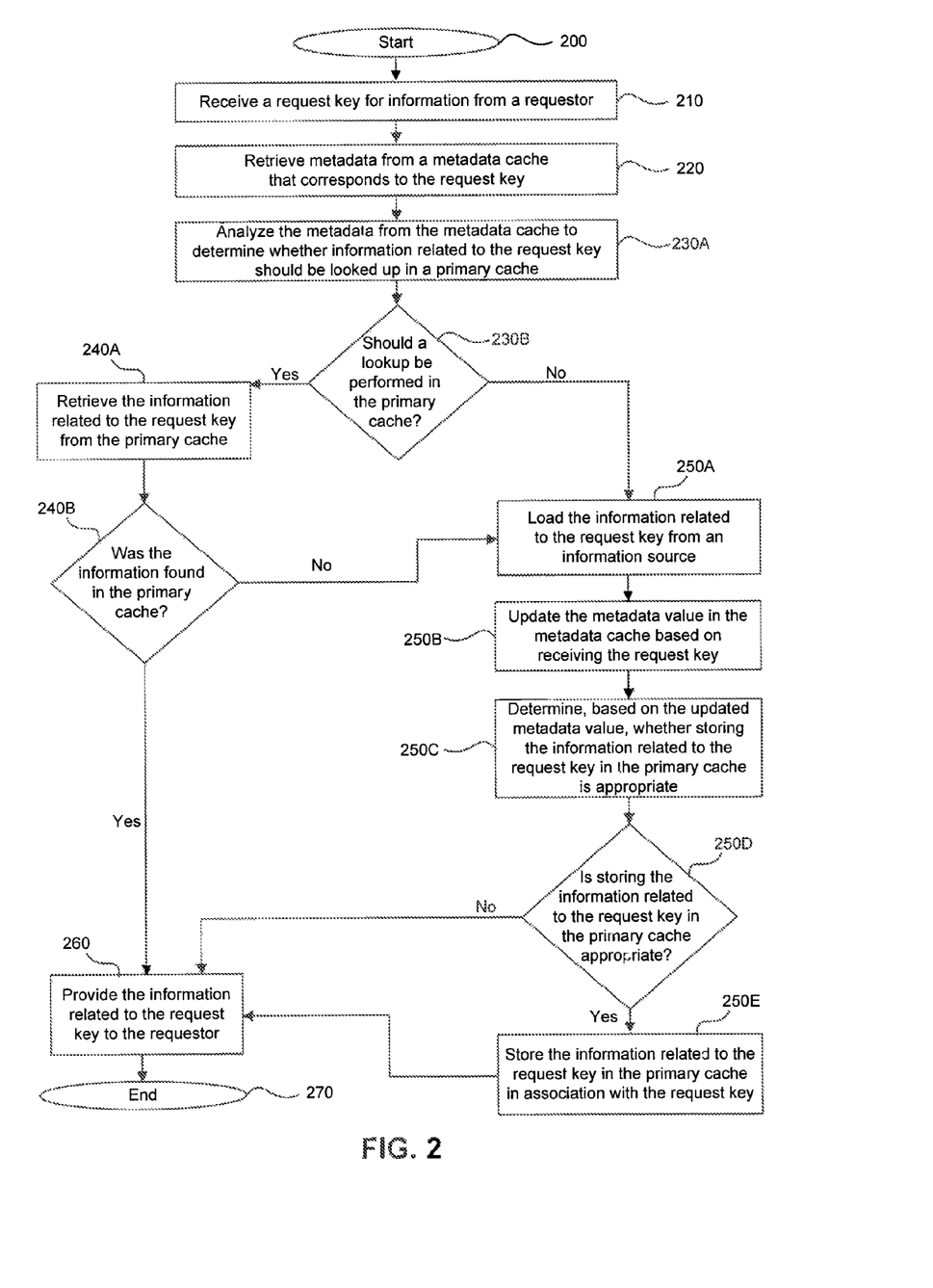
FIG. 2 is a flowchart of an exemplary method, according to an embodiment.

FIG. 2 is a flowchart of an method for managing web information access (stages 200-270). The method is described herein with reference to computer system 100 for brevity and convenience. However the method 200 is not necessarily intended to be limited to the structure of computer system 100.

The method begins at stage 200, Start.

In stage 210, a request key for information is received from a requestor. For example, stage 210 may be performed by key request receiver 144 that receives request key 142 from requestor 140. As discussed above, request key 142 is an identifier that specifies information that requestor 140 needs, such that request key 142 can be used to identify the information for potential retrieval from primary cache 160 or from information source 170.

In stage 220, metadata is retrieved from a metadata cache that corresponds to the request key. For example, stage 220 may be performed by metadata retriever 146, using request key 142 to retrieve metadata from metadata cache 150. As discussed below, metadata retriever 146 may use a hashed version of request key 142 provided by hashing unit 154 (with appropriate collision handling) to retrieve metadata from metadata cache 150. Various types of metadata and how they may be used are discussed below.

In stage 230A, the metadata from the metadata cache is analyzed to determine whether information related to the request key should be looked up in a primary cache. For example, stage 230A may be performed by metadata analyzer 148, which may process the metadata to determine if request key 142 should be looked up in primary cache 160.

The operation of metadata analyzer 148 varies in various embodiments. In general, the metadata will provide information that can be used to deduce whether it is likely that primary cache 160 should have information related to request key 142. For example, if the metadata is a count of the number of times that request key 142 was received, and the rule for adding to primary cache 160 is that request key 142 needs to have occurred twice, and if the metadata indicates that a request key 142 was not received before, it can be deduced from the metadata that the information related to request key 142 is not present in primary cache 160. By contrast, if the metadata indicates that request key 142 was received at least twice previously, it can be deduced that primary cache 160 may have the information stored as the current request must be at least a third request. However, stage 230A may vary based on the nature of the metadata, as discussed below.

It should be noted that sometimes the metadata alone will not provide an accurate indication of whether primary cache 160 actually contains information corresponding with request key 142. For example, if hashing is used for the metadata key, multiple request key 142 values may hash to the same metadata key, resulting in collisions. Hashing and collision management are discussed in greater detail, below. Furthermore, primary cache 160 has limited space, and hence it will be necessary to remove outdated information to make room for new information. Strategies for removing information are discussed below. Because information may be removed from primary cache 160, metadata cache 150 can provide a helpful indication as to whether primary cache 160 is likely to have information related to request key 142, but this indication may not be definitive. Therefore, it will typically be necessary to actually check primary cache 160 for related information when metadata cache 150 indicates that the information is likely in primary cache 160.

In stage 230B, it is determined if a lookup for information related to the request key in the primary cache should be performed. The method branches, such that if yes, the method proceeds to stage 240A. If no, the method proceeds to stage 250A. For example, stage 230B branches based on the determination provided by metadata analyzer 148 as discussed in stage 230A above.

In stage 240A, when the analyzing determines that the information related to the request key should be looked up in the primary cache, the information related to the request key is retrieved from the primary cache. The method then proceeds to stage 240B. For example, stage 240A may be performed by cache data manager 152, which accesses the information related to request key 142 from primary cache 160. It should be noted that stage 240A may not be successful, because as discussed above, the metadata may indicate that a lookup should be performed even if information to request key 142 is not actually present in primary cache 160. For example, the metadata may lead to a lookup for information that was once in primary cache 160, but has since been evicted. This situation is handled by stage 240B.

In stage 240B, the method branches based on whether the information was found in the primary cache. If yes, the method proceeds to stage 260. If no, the method proceeds to stage 260. For example, cache data manager 152 may make the determination based on the results of stage 240A.

When the analyzing determines that the information related to the request key should not be looked up in the primary cache, or if the information related to the request key was not found in the primary cache, certain stages are performed in stages 250A-E.

In stage 250A, information related to the request key is loaded from an information source. For example, stage 250A may be performed by cache data manager 152, which accesses the information related to request key 142 from information source 170. As discussed above, information source 170 may access information via network connection 190 from network 192, and the information may, for example, be provided by server 194 from web page storage 196. Information source 170 may, for example, use HTTP requests to load web page data, but it will be recognized that information source 170 may use a wide variety of protocols to access data corresponding to request key 142.

In stage 250B, the metadata value is updated in the metadata cache based on receiving the request key. For example, stage 250B may be performed by cache data manager 152, using request key 142 to update metadata cache 150. The nature of the metadata value update varies by embodiment, and is discussed below in the context of an explanation of types and usages of metadata. In general, cache data manager 152 will use request key 142 or an appropriate permutation to access the appropriate metadata, and it will then change the metadata to reflect that an access attempt has occurred. If the metadata is indicative of simply whether a threshold number of access attempts, it may be unnecessary to further update the metadata once the threshold has been met. For example, if the metadata causes information to be added to primary cache 160 on the third and subsequent attempts, no further updates will be necessary after three attempts have been made. However, other types of metadata, such as chronological metadata, may result in a need for updates to the metadata as it changes over time.

In stage 250C, it is determined, based on the updated metadata value, whether storing the information related to the request key in the primary cache is appropriate. For example, stage 250C may be performed by cache data manager 152. The determination of whether to store the information related to the request key varies by embodiment, and is discussed below in the context of an explanation of types and usages of metadata. In general, the determination is designed to store information in primary cache 160 so as to optimize resource usage.

In stage 250D, the method branches based on whether storing the information related to the request key in the primary cache is appropriate. The branching occurs based on the determination from stage 250C. If yes, the method continues to stage 250E. If no, the method continues to stage 260. For example, stage 250D may be performed by cache data manager 152 as discussed in stage 250C.

In stage 250E, when it is determined that storing is appropriate, the information related to the request key in the primary cache is stored in association with the request key. The method continues to stage 260. For example, stage 250E may be performed by cache data manager 152 by storing the information from information source 170 in primary cache 160, based on request key 142. In general, the information is stored by using request key 142 to access the appropriate location in primary cache 160 to store the information, and adding the information to that location. Additional steps may be required if hashing is used or if it is necessary to make room in primary cache 160. Both of these contingencies are discussed in greater detail, below.

In stage 260, the information related to the request key is provided to the requestor. For example, stage 260 may be performed by cache data manager 152, that provides retrieved information 172 from either primary cache 160 or information source 170 that is appropriately associated with request key 142. Retrieved information 172 is transferred to requestor 140.

The method ends at stage 270, End.

Examples of Use and Data Flow

Figure 3:
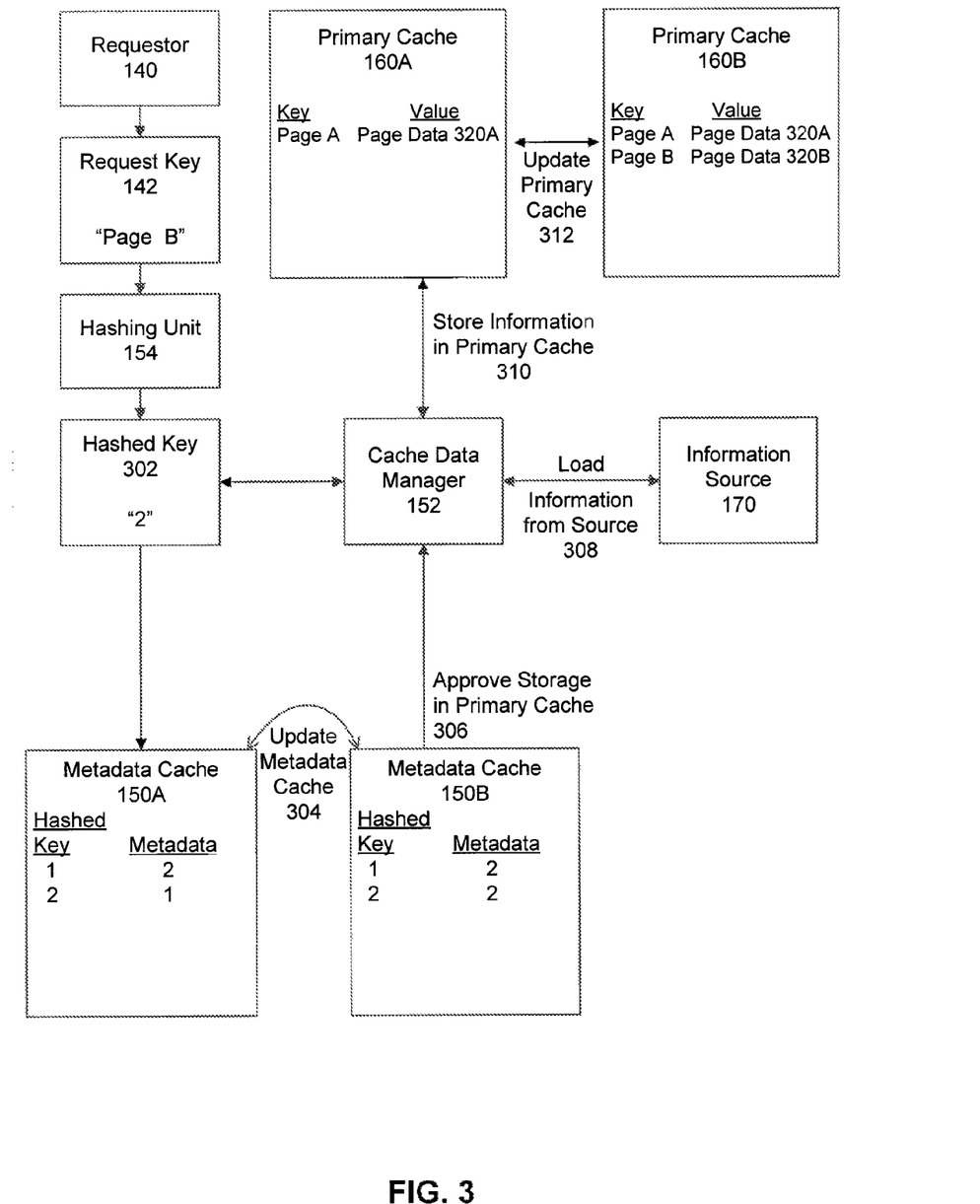
FIG. 3 is another diagram illustrating an exemplary system and data flow, according to an embodiment.

FIG. 3 is another diagram illustrating an exemplary system, according to an embodiment. The diagram of FIG. 3 is annotated to show the data flow through the system. It is to be noted that FIG. 3 is representative of only one embodiment, and not all features present in FIG. 3 will be present in all embodiments.

In FIG. 3, requestor 140 transmits request key 142 to hashing unit 154. Request key 142 is characterized in FIG. 3 as "Page B". This is an example string, and as discussed above request key 142 generally contains information, such as a URL or an HTTP request, that identifies the information that requestor 140 needs.

Hashing unit 154 is an optional subsystem of various embodiments. It processes request key 142 into a smaller piece of information that is intended to, with high probability, uniquely represent the data being hashed. For example, a web address may be hashed into 64 bits that represent unique aspects of the web address. For example, in FIG. 3 hashing unit 154 processes "Page B" to yield "2" as hashed key 302, because "2" is chosen to uniquely represent "Page B". Various hashing techniques may be used to generate hashed key 302 from request key 142. In general, hashing techniques are chosen for their ability to preserve uniquely identifying information while discarding information that does not distinguish request key 142.

It should be noted that even though hashed key 302 is chosen to represent request key 142 uniquely, because hashed key 302 contains less information than request key 142, multiple request keys may hash to the same hashed key though this may be unlikely. This situation is known as a collision. Various techniques (optional here) may be used to manage collisions. For example, various data structures and architectures may be used in metadata cache 150 and primary cache 160 to retrieve information associated with request key 142 from the superset of information associated with hashed key 302. For example, primary cache 160, instead of simply using a key-value mapping, may map from hashed key 302 to a data structure that manages information such that the data structure organizes information base on full request key 142. An example of this approach is chaining, in which a hashed request key maps to a bucket that accesses a linked list to manage data associated with different keys. It will be recognized that a wide variety of hashing techniques and collision management techniques may be used, as appropriate. Furthermore, even though hashing presents a danger of collisions, it may be advantageous in that since less information is involved with a hashed key, metadata cache 150 and primary cache 160 may be structured to use less memory or make better use of the memory that they use.

Once hashed key 302 is ready, it is sent to metadata cache 150A (metadata cache 150A illustrates a set of initial contents for metadata cache 150). Metadata cache 150A includes a series of keys and metadata values. In the example of FIG. 3, metadata cache 150A indicates that "1" and "2" have been seen before. FIG. 3 includes an embodiment in which the criterion for performing a lookup in the primary cache is that a hashed key must have been used at least twice. As a result, metadata cache 150A provides evidence that there should be a lookup into primary cache 160A (primary cache 160A illustrates a set of initial contents for primary cache 160) if hashed key 302 were "1", as the metadata indicates that "1" has been seen twice before. If hashed key 302 were "26", which was never requested before, there would be no entry for hashed key 302 in metadata cache 150A. For hashed key 302 value "26", the lack of metadata would indicate that there is no reason to do a lookup, as no entry would have been stored previously in metadata cache 150A. In this case, the information is loaded and a hashed key 302 "26" would be associated with a metadata value of 1 in metadata cache 150A, so that if hashed key "26" appears again, then it will be a candidate for storage in primary cache 160.

FIG. 3 further illustrates the case in which the metadata for hashed key 302 "2" causes an update metadata cache operation 304. Because metadata cache 150A initially associates metadata of 1 with hashed key 302 "2", initially a load information from source 308 operation will occur. However, in an update metadata cache 304 operation, the metadata associated with hashed key 302 "2" will become 2 in metadata cache 150B. The changed metadata will lead to the stage of storing of the previously loaded information in primary cache 310.

The update of primary cache 160A to primary cache 160B occurs in stage 312. Had hashed key 302 "2" become one, the information would not be stored, as one occurrence of hashed key 302 is insufficient to permit storage. However, as shown in FIG. 3, metadata cache 150B approves storage in primary cache 310 to cache data manager 152. Cache data manager 152 will have retrieved the information from information source 170, and proceeds to store information in the primary cache 160 in stage 310.

It can be seen that storing information in primary cache 160 is the stage of updating the primary cache 312. This stage is illustrated by showing the transformation of primary cache 160A to primary cache 160B, such that primary cache 160A includes page data 320A associated with the key A, and is otherwise empty. After updating the primary cache 314, the key "Page B" is now associated with page data 320B. In one embodiment, future calls to the key "Page B" will be supplied with the cached version, as long as "Page B" remains in primary cache 160. Furthermore, note that request key 142 "Page Z" has not been requested from primary cache 160A. Therefore, neither request key 142 "Page Z" nor a value (such as Page Data 320Z) will be stored in primary cache 160 until metadata cache 150 has received a hashed key 302 (such as "26") associated with request key 142 "Page Z" a sufficient number of times.

In other embodiments, there may be a check to ascertain if the cached data is stale before providing the cached version. For example, an embodiment may check if the cached data is older than a threshold value, or if there has been an update since the time the cached version was stored, in order to help ensure that outdated information will not be provided by primary cache 160.

Not shown in FIG. 3, as discussed above, once the information has been retrieved, retrieved information 172 will be sent to requestor 140.

Additional Features

In various embodiments, the metadata from metadata cache 150 that is associated with a request key 142 may vary in content and management from embodiment to embodiment. In one embodiment, the metadata associated with request key 142 includes the number of times that request key 142 has been generated and updating the metadata value comprises incrementing the number of times that request key 142 has been generated. It should be noted that as discussed above, the metadata may no longer continue to be updated after the number of times reaches a certain threshold.

For example, the metadata may be updated until request key 142 changes from 1 to 2, at which point the metadata can store the information in primary cache 160 and the metadata will indicate that thereafter, it is appropriate to perform a lookup in primary cache 160 before loading the information from information source 170. Likewise, this embodiment may provide that storing the information related to request key 142 is considered appropriate if request key 142 has been generated at least twice after the metadata is updated.

Metadata may also include and utilize chronological information. For example, various embodiments may use timestamp unit 156 to store chronological information in metadata cache 150. In this embodiment, the metadata further includes timestamp information that specifies one or more points in time at which request key 142 was generated, and determining that storing is appropriate is additionally based on the timestamp information. For example, the timestamp information may be used so that only appearances of request key 142 within a set time interval are considered, or such that the metadata may include a count that decays over time. Also as discussed, timestamp information may be used to help guarantee that primary cache 160 does not provide stale information.

Metadata may also include information about the resources associated with retrieving the information associated with request key 142. Such information may include, but is not limited to processing, memory, storage and network resource requirements. Thus, determining that storing is appropriate is additionally based on resources required to load the information from the information source. For example, pieces of information associated with low resource requirements, may be added to primary cache 160 preferentially because multiple small cache hits may provide better results than fewer large cache hits.

It is to be noted that as primary cache 160 and metadata cache 150 have limited space, it may become necessary to remove information from primary cache 160 and metadata cache 150. This problem is more likely to occur with respect to primary cache 160, as primary cache 160 may associate a substantial amount of information with each request key 142. Metadata cache 150, by contrast, usually only associates a small amount of metadata with each request key 142. Furthermore, additional space savings are possible with hashing as discussed above.

However, at some point it may well be necessary to remove contents from primary cache 160 or metadata cache 150 to make room for new contents.

If metadata cache 150 needs to make room, one embodiment can use a least-recently-used approach, such that newer content is kept preferentially. Such an approach can either utilize timestamp information or allow the metadata to decay over time. For example, the metadata may only reflect accesses within a predetermined time interval, such as the last 24 hours, or alternatively the number of accesses associated with each piece of metadata may be decremented at regular time intervals.

However, managing the contents of primary cache 160 is critical to utilize resources effectively. Two exemplary strategies are as follows. One strategy is that when storing the requested information in the primary cache would exceed the capacity of the cache, information is removed from the primary cache based on a least recently used (LRU) algorithm. This approach generally removes information for which there will be low demand.

Alternatively, when storing the requested information in the primary cache would exceed the capacity of the cache, information is removed based on the metadata. While certain chronological metadata may be used to implement the LRU approach, it should be recognized that other metadata provide other ways of deciding which information to remove from primary cache. For example, primary cache 160 entries whose request key 142 has appeared the fewest times, or primary cache 160 entries that consume the greatest space may be removed. Many types of approaches may be appropriate to a given set of metadata.

Thus, using metadata cache 150 can provide vastly improved resource usage for primary cache 160. While metadata cache 150 uses some memory and resources, it can serve as a gatekeeper to ensure that primary cache is only storing information that is most likely to be subsequently used. This approach helps to ensure that cached information is relevant, and avoids time to store cached information before it can be confirmed that it is useful.

Hence, providing a metadata cache as described herein represents a new and useful way of maximizing cache performance with limited resources.

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for caching, comprising:
   receiving a request key for information from a requestor;
   retrieving metadata from a metadata cache that corresponds to the request key, the metadata cache provided in addition to a primary cache, wherein the metadata retrieved from the metadata cache provides an indication of whether information related to the request key is stored at the primary cache, a number of times that the request key has been received, processing resources, and network resources required to load the information from an information source;
   analyzing the metadata from the metadata cache to determine whether the information related to the request key satisfies a criterion before performing a lookup in the primary cache;
   when the analyzing determines that the information related to the request key satisfies the criterion, retrieving the information related to the request key from the primary cache; and
   when the analyzing determines that the information related to the request key fails to satisfy the criterion, or when the information related to the request key was not found in the primary cache, performing the steps of:
      loading the information related to the request key from the information source,
      updating the metadata value in the metadata cache based on receiving the request key;
      refraining, based on the updated metadata value and the criterion, from storing the information related to the request key in the primary cache if the number of times that the request key has been received is below a predetermined number of times and based on the processing resources and the network resources required to load the information from the information source, and
      storing the information related to the request key in the primary cache in association with the request key.

2. The computer-implemented method of claim 1, wherein the method further comprises:
   providing the information related to the request key to the requestor.

3. The computer-implemented method of claim 1, wherein the request key is hashed before it is used to retrieve information from the primary cache or metadata cache, and the primary cache and metadata cache include functionality to handle collisions.

4. The computer-implemented method of claim 1, wherein updating the metadata value comprises incrementing the number of times that the request key has been received.

5. The computer-implemented method of claim 1, further comprising refraining from storing the information related to the request key in the primary cache until the number of times that the request key has been received is at least two.

6. The computer-implemented method of claim 1, wherein the metadata further comprises timestamp information that specifies one or more points in time at which the request key was received, and updating the metadata value comprises storing a timestamp of the time at which the request key was received.

7. The computer-implemented method of claim 1, wherein when storing the requested information in the primary cache would exceed the capacity of the cache, information is removed from the primary cache based on a least recently, used (LRU) algorithm.

8. The computer-implemented method of claim 1, wherein when storing the requested information in the primary cache would exceed the capacity of the cache, information is removed based on the metadata.

9. A system for caching, comprising:
   a key request receiver, configured to receive a request key for information from a requestor;
   a metadata retriever, configured to retrieve metadata from a metadata cache that corresponds to the request key, the metadata cache provided in addition to a primary cache, wherein the metadata retrieved from the metadata cache provides an indication of whether information related to the request key is stored at the primary cache, a number of times that the request key has been received, processing resources, and network resources required to load the information from an information source;
   a metadata analyzer, configured to analyze the metadata from the metadata cache to determine whether the information related to the request key satisfies a criterion before performing a lookup in the primary cache; and
   a cache data manager, configured to, when the metadata analyzer determines that the information related to the request key satisfies the criterion, retrieve the information related to the request key from the primary cache, and
   when the metadata analyzer determines that the information related to the request key fails to satisfy the criterion, or when the information related to the request key was not found in the primary cache, perform the steps of:
      loading the information related to the request key from the information source;
      updating the metadata value in the metadata cache based on receiving the request key;
      refraining, based on the updated metadata value and the criterion, from storing the information related to the request key in the primary cache if the number of times that the request key has been received is below a predetermined number of and based on the processing resources and the network resources required to load the information from the information source, and
      storing the information related to the request key in the primary cache in association with the request key.

10. The system of claim 9, wherein the cache data manager is further configured to provide the information related to the request key to the requestor.

11. The system of claim 9, wherein the request key is hashed before it is used to retrieve information from the primary cache or metadata cache, and the primary cache and metadata cache include functionality to handle collisions.

12. The system of claim 9, wherein updating the metadata value comprises incrementing the number of times that the request key has been received.

13. The system of claim 9, further comprising refraining from storing the information related to the request key in the primary cache until the number of times that the request key has been received is at least two.

14. The system of claim 9, wherein the metadata further comprises timestamp information that specifies one or more points in time at which the request key was received, and updating the metadata value comprises storing a timestamp of the time at which the request key was received.

15. The system of claim 9, wherein when storing the requested information in the primary cache would exceed the capacity of the cache, information is removed from the primary cache based on a least recently used (LRU) algorithm.

16. The system of claim 9, wherein when storing the requested information in the primary cache would exceed the capacity of the cache, information is removed based on the metadata.

17. A non-transitory computer readable storage medium having instructions stored thereon that, when executed by one or more processors, cause the one or more processors to execute a method for caching, comprising:

receiving a request key for information from a requestor;

retrieving metadata from a metadata cache that corresponds to the request key, the metadata cache provided in addition to a primary cache, wherein the metadata retrieved from the metadata cache provides an indication of whether information related to the request key is stored at the primary cache, a number of times that the request key has been received, processing resources, and network resources required to load the information from an information source;

analyzing the metadata from the metadata cache to determine whether the information related to the request key satisfies a criterion before performing a lookup in the primary cache;

when the analyzing determines that the information related to the request key satisfies the criterion, retrieving the information related to the request key from the primary cache; and when the analyzing determines that the information related to the request key fails to satisfy the criterion, or when the information related to the request key was not found in the primary cache, performing the steps of:

loading the information related to the request key from the information source, updating the metadata value in the metadata cache based on receiving the request key, refraining, based on the updated metadata value and the criterion, from storing the information related to the request key in the primary cache if the number of times that the request key has been received is below a predetermined number of and based on the processing resources and the network resources required to load the information from the information source, and storing the information related to the request key in the primary cache in association with the request key.

18. The non-transitory computer readable storage medium of claim 17, wherein the method further comprises:

providing the information related to the request key to the requestor.

\* \* \* \* \*